June 10, 1952 — W. T. HEMBREE — 2,599,711
RODENT TRAP
Filed March 8, 1948 — 2 SHEETS—SHEET 1
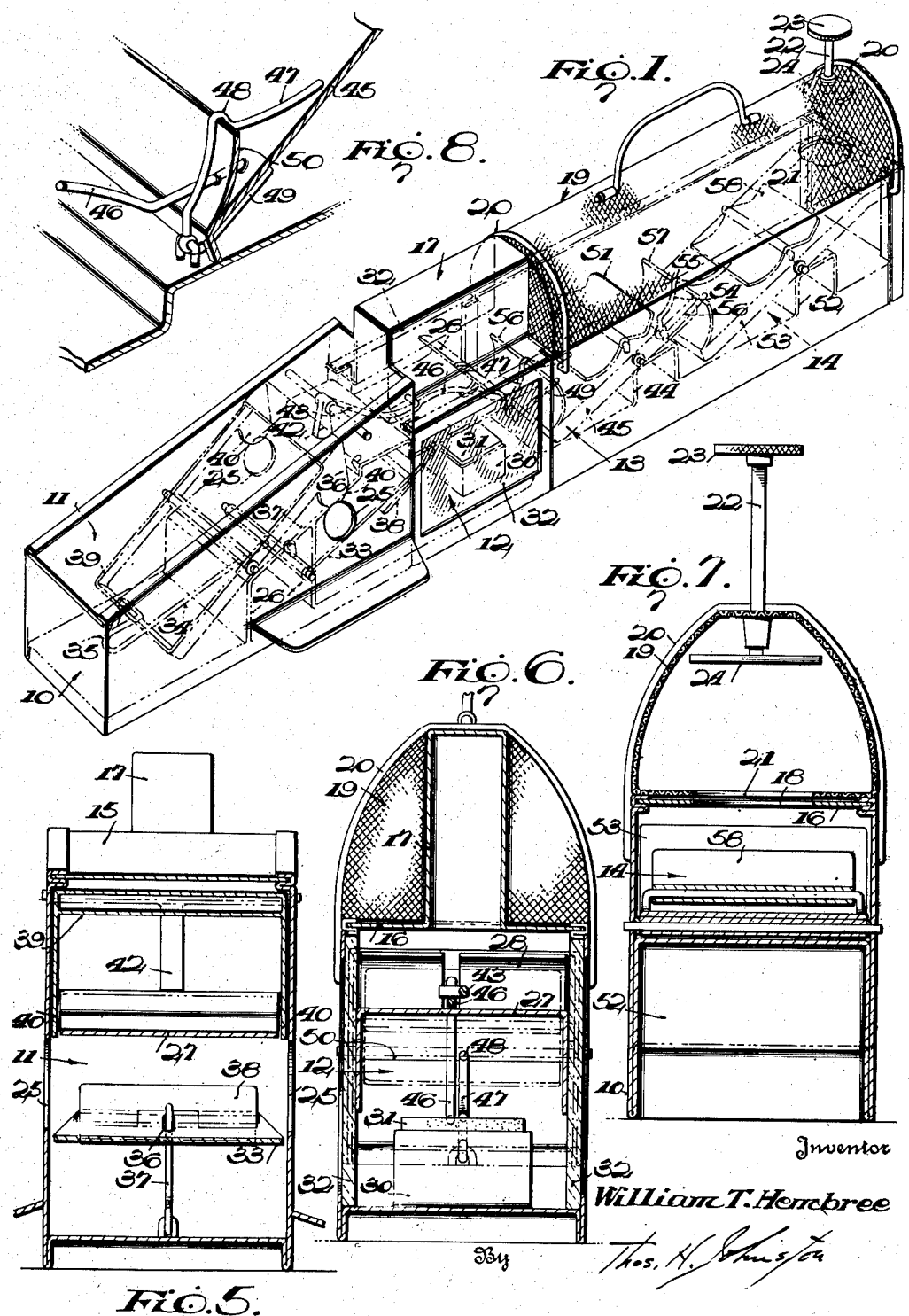
Inventor
William T. Hembree

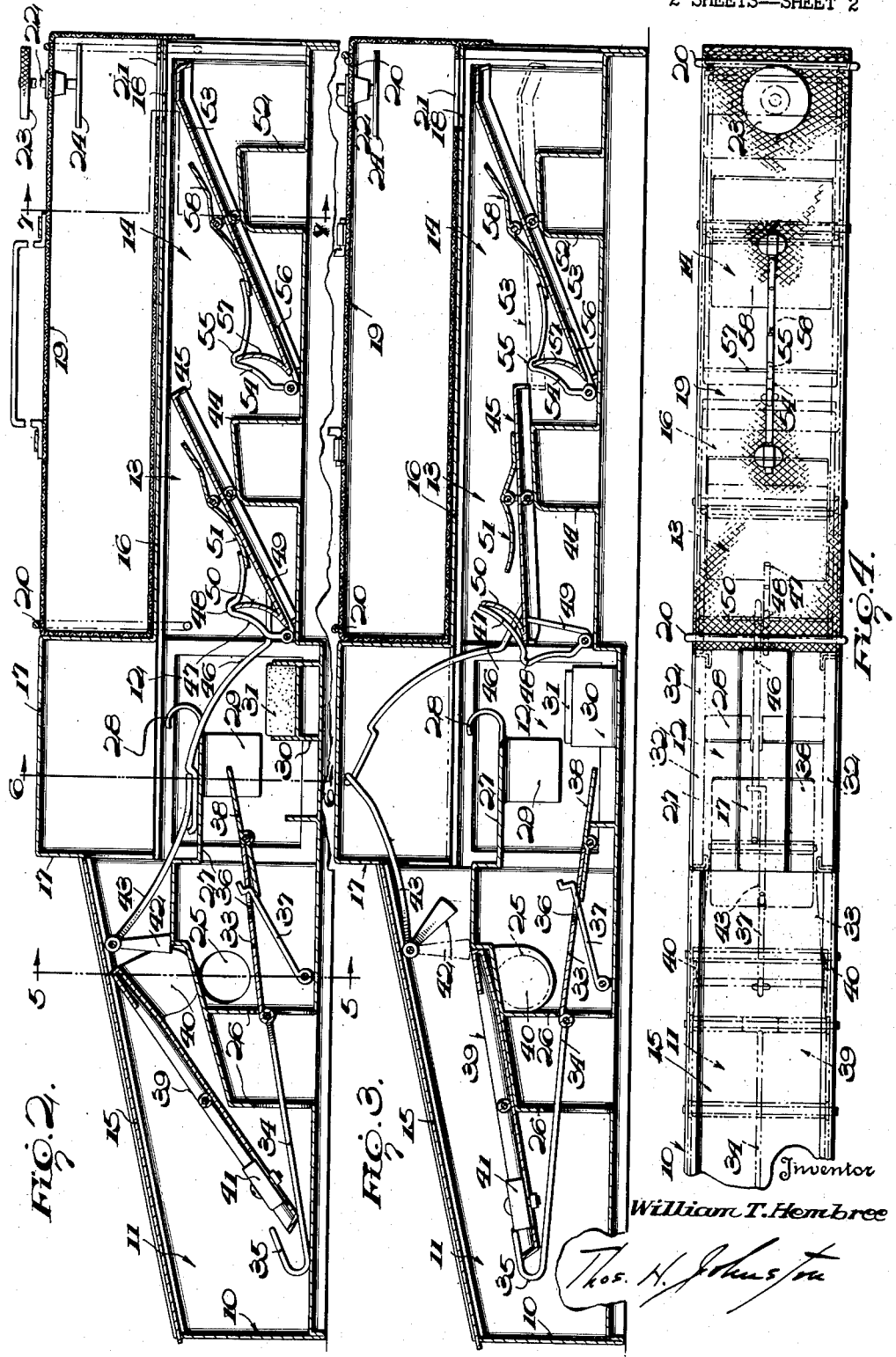

Patented June 10, 1952

2,599,711

UNITED STATES PATENT OFFICE 2,599,711

RODENT TRAP

William T. Hembree, Kingston, Tenn.

Application March 8, 1948, Serial No. 13,630

11 Claims. (Cl. 43—67)

This invention relates to an improved rodent trap, especially adapted for catching mice or rats although, however, the trap may be employed for catching other animals.

Objects of the invention are to provide a trap wherein a mouse, for instance, after entering the trap and progressing toward the bait, will trip certain entrance-closing mechanism and actuate the same to closed position cutting off retreat of the mouse, wherein said mechanism will be automatically locked closed, wherein the mouse will then, in further progressing forwardly, actuate certain releasing mechanism freeing the former mechanism for automatic movement resetting the trap, and wherein, as the mouse still further progresses forwardly, the mouse will actuate still other cage-closing mechanism clearing the entrance to a cage, while following the movement of the mouse into the cage, said cage-closing mechanism will automatically reset itself to again close the entrance to the cage and so confine the mouse in the cage.

Other objects of the invention are to provide a trap wherein the entrance closing mechanism will be normally latched in set open position, wherein the releasing mechanism will itself normally be latched in set position and must be released by the mouse for actuation by the mouse to release the entrance-closing mechanism, so that the entrance-closing mechanism may automatically reset itself in open position, and wherein, likewise, the cage-closing mechanism will also itself be latched in set position closing the cage and must be released by the mouse for actuation by the mouse to open position so that the mouse may enter the cage.

Other and incidental objects of the invention will appear during the course of the following description, and in the drawings:

Figure 1 is a perspective view of my improved trap.

Figure 2 is a longitudinal sectional view showing the trap set in normal position.

Figure 3 is a view similar to Figure 2 and showing the releasing mechanism actuated to release the entrance closing mechanism of the trap.

Figure 4 is a plan view of the trap.

Figure 5 is a section on the line 5—5 of Figure 2.

Figure 6 is a section on the line 6—6 of Figure 2.

Figure 7 is a section on the line 7—7 of Figure 2.

Figure 8 is a detail perspective view showing the latch for the platform of the releasing mechanism.

Referring now more particularly to the drawings, I employ an oblong casing 10 rectangular in cross section. In the present instance, I have shown the casing as formed of sheet metal, as such an embodiment of the invention may likely prove the most expedient, but it is to be understood that any other approved materials may be employed. To facilitate the description of the invention, the casing may be said to embody an entrance chamber 11, a bait chamber 12, a trip chamber 13 next forwardly of the bait chamber, and a final forward exit chamber 14. The mechanism disposed in these several chambers will be duly described in sequence.

Closing the chamber 11 of the casing is an inclined cover plate 15 received in suitable channels on the side walls of said chamber and slidably removable rearwardly. Closing the chambers 12, 13, and 14 is a similarly mounted cover plate 16 slidably removable forwardly. At its inner end, the plate 16 is slotted and provided with an upstanding hood 17 rising medially of the chamber 12, while near its outer end, said plate is formed with an opening 18 providing an exit from the chamber 14.

Resting upon the cover plate 16 to abut the hood 17 is a removable cage 19 which may be of woven wire or the like. This cage is normally held in position by bail-like keepers 20 which may be swung laterally to free the cage and is formed in the bottom wall thereof with an opening 21 registering with the opening 18 of the exit chamber 14. Slidable through the top wall of the cage is a rod 22 provided at its upper end with a suitable handle 23 and at its lower end with a closure plate 24 adapted to close the opening 21. The rod is frictionally mounted to normally hold the plate 24 elevated, but may be pushed downwardly so that the plate 24 will close the opening 21, when the cage may be removed with any mice or other rodents therein.

Formed in the side walls of the chamber 11 are oppositely disposed openings providing entrances 25, and rising from the bottom wall of said chamber are legs 26 carrying a shelf 27 which projects into the chamber 12 and is curled upwardly at its free end to provide a flange 28 blocking the space above the shelf. The free end portion of the shelf is further provided with depending side plates 29, and fixed within the chamber 12 immediately forward of said plates is a bait holder 30 in which is removably disposed a suitable bait 31, the plates 29 defining a somewhat restricted passage leading to the bait. Preferably, the side walls of the chamber 12 are of glass or the like providing windows 32, either of which may be slidably raised for replenishing the bait, said windows being held by suitable flanges on the side walls of the casing 10.

The entrance-closing mechanism of the chamber 11 of the trap will now be described.

Pivoted within the chamber 11 at a point near the foremost of the legs 26 of the shelf 27 is a platform 33 which projects beneath the shelf into the chamber 12, and extending rearwardly from said platform freely through a suitable slot in the rearmost of the legs 26 is a tail arm 34 carrying an overhanging tail piece 35. Formed in the forward end portion of the platform is a slot 36 through which freely projects the free end of a latch 37 pivoted upon the bottom wall of said chamber, and mounted to rock upon the forward end of the platform is a treadle 38, the rear end of which projects beneath said slot to engage the latch 37. The balance between the parts is such that when the platform 33 is raised, as seen in Figure 2, the free end of the latch 37 will depress the rear end of the treadle 38 and engage against the forward end wall of the slot 36 for locking the platform in set raised position, while when a mouse, for instance, steps upon the forward end of the treadle, the latch will be tripped and the platform freed for downward movement under the weight of the mouse. As will be perceived, in the Figure 2 position of the parts, the latch gravitates to a position depressing the rear end of the treadle and locking the platform raised, while the treadle gravitates to a position resting at its rear end against the upper end portion of the latch. The latch will, as will be appreciated, afford rigidity to the platform when set so that a mouse entering upon the platform will not be frightened by any jiggling thereof.

Pivoted within the chamber 11 above the rear end portion of the shelf 27 is an entrance-closing rocker 39 provided at its forward end with side flaps 40 and at its rear end with a counterweight 41 adapted to normally hold the rocker set in rearwardly tilted open position, as shown in Figure 2, with the side flaps raised to clear the entrances 25. However, as will be observed, the arm 34 of the platform 33 projects rearwardly beneath the rocker while the tail piece 35 of said arm is disposed to engage over the rear end of the rocker. Consequently, when the forward end of the platform 33 is depressed, as shown in Figure 3, the arm 34 will swing the rocker to forwardly tilted closed position resting upon the shelf 27, in which position of the rocker, the side flaps 40 will block the entrances 25. Since, however, the counterweight 41 will, if the rocker is not latched in closed position, immediately return the rocker to open position as well as depress the arm 34 and raise the platform 33 to set position, as shown in Figure 2, it becomes necessary to latch the rocker closed, as will now be described.

Pivoted within the chamber 11 in a plane near the forward end of the entrance-closing rocker 39 is a latch 42 which normally hangs downwardly in vertical position and is of a size and character to provide a counterweight for a forwardly extending lever 43. The purpose of said lever will later appear. At the present juncture, it is to be noted that as the rocker 39 is swung to closed position, as previously described, the rocker will swing the latch 42 slightly forward, after which the latch will return by gravity to engage over the forward end of the rocker, as shown in dotted lines in Figure 3, and so lock the rocker in closed position. Consequently, the rear end of the rocker will then coact with the tail piece 35 of the arm 34 of the platform 33 for locking the platform depressed.

Assuming now that a mouse enters the chamber 11 through either of the entrances 25, the mouse will encounter the platform 33 and, being attracted by the bait 31, will move forwardly along the platform and so step upon the forward end portion of the treadle 38. The latch 37 will thus be tripped, as previously described, when the weight of the mouse will swing the platform 33 downwardly to the position shown in Figure 3, with the result, as also previously described, that the rocker 39 will be swung to closed position cutting off the retreat of the mouse. The mouse, in so far as retreat is concerned, will thus be trapped in the chamber 12. However, as will now also be appreciated, upon the raising of the lever 43, the latch 42 will be swung forwardly to release the rocker 39, when the parts will return to set position, as shown in Figure 2.

The releasing mechanism in the trip chamber 13 for the entrance-closing mechanism of the chamber 11 will now be described.

Formed from the bottom wall of the trip chamber 13 is a bridge 44 of inverted U-shape in cross section, and pivoted upon said bridge is a trip platform 45 gravitating, as shown in Figure 2, to rearwardly tilted set position. Fixed to the rear end portion of said platform is a lever 46, the free end portion of which is freely received through a suitable slot in the flange 28 at the forward end of the shelf 27 and normally, when the trap is set as shown in Figure 2, rests upon said shelf beneath the forward end of the lever 43 of the latch 42 to slidably engage with said latch lever. Thus, when the platform 45 is tilted forwardly, as shown in Figure 3, the lever 46 will be raised, with the result that the lever 43 of the latch 42 will likewise be raised for swinging said latch forwardly and thus tripping said latch. Consequently, the rocker 39 in the chamber 11 will be released, when the entrance-closing mechanism, previously described, will, as also previously described, automatically return to set position. In this connection, the purpose of the hood 17 on the cover plate 16 becomes apparent, which purpose is to accommodate the upward throw of the levers 43 and 46.

Pivoted in a plane near the rear end of the trip platform 45 is a latch 47 which extends forwardly over the rear end portion of the platform and is bowed to provide a socket 48, while at its lower end, said latch is provided with a tail rod 49 which extends forwardly under the rear end portion of the platform. Fixed to the rear end of the platform is an upstanding bowed catch 50 adapted to slidably coact with the latch 47 for engagement in the socket 48, and pivoted upon the platform medially thereof is a treadle 51, the rear end of which, when the platform is set, engages beneath the free end of said latch.

As seen in Figure 2, the latch 47 will normally receive the catch 50 in the socket 48 thereof and lock the platform 45 set, so that the platform will not teeter under the weight of a mouse thereon. However, when the forward end of the treadle 51 is depressed, the latch will be raised to disengage the catch 50, so that the platform may rock forwardly and raise the latch 47 to the position shown in Figure 3. Consequently, the tail rod 49 of the latch will also be raised, so that when the platform is permitted to automatically return by gravity to its set position, as shown in Figure 2, the platform will act on the tail rod to swing the latch forwardly over the rear end of the treadle 51 to engage with the catch 50 as the platform settles in set position. Thus, the platform will be normally latched in set position, will automatically return to set position, and will, as it returns, automatically actuate the latch therefor for locking the platform in set position.

Returning now to the mouse trapped in the chamber 12, as previously described, it will be seen that the mouse may progress only forwardly onto the platform 45 when, upon stepping upon the forward end of the treadle 51, the platform will be released to swing forwardly, under the weight of the mouse, to the position shown in Figure 3, so that the mouse may then enter the chamber 14. Upon forward actuation of the platform 45, the entrance-closing mechanism of the trap will be released to return to set position, as previously described, while, as the mouse leaves the platform 45, said platform will, as also previously described, automatically return to set latched position, as shown in Figure 2, cutting off retreat of the mouse. Thus, the mouse will be trapped in the chamber 14.

The cage-closing mechanism in the chamber 14 will now be described.

The cage-closing mechanism is, for the most part, a repetition of the releasing mechanism in the chamber 13, just previously described, and it is therefore unnecessary to enter into much detail. Rising from the bottom wall of the chamber 14 is a bridge 52 upon which is pivoted an exit platform 53 gravitating to rearwardly tilted set closed position, and pivoted in a plane near the rear end of said platform is a latch 54 having a socket 55 and provided with a tail rod 56. Upstanding from the rear end of the platform is a catch 57 engageable in the socket 55 of the latch for locking the platform set, and pivoted upon the platform is a treadle 58 normally engaging at its rear end beneath the forward end of said latch. All of the foregoing parts of the cage-closing mechanism correspond to like parts of the previously described releasing mechanism in the chamber 13 and function in the same manner.

It is now to be noted that the forward end of the platform 53 is flattened and, when the platform is locked in set position, extends closely beneath the exit opening 18 in the cover plate 16. Consequently, the platform serves to block said opening as well as the opening 21 of the cage 19 to prevent retreat from the cage.

Returning now to the mouse trapped in the chamber 14, as previously described, it will be seen that when the mouse steps upon the forward end of the treadle 58, the platform 53 will be released to swing, under the weight of the mouse, forwardly to open position, as shown in dotted lines in Figure 3, clearing the exit opening 18. Accordingly, the mouse may then climb from the forward end of the platform through said opening and through the opening 21 into the cage 19. As soon as the mouse leaves the platform, said platform will, as will be understood, automatically return to locked set position blocking the openings 18 and 21 so that the mouse will thus be trapped in the cage. At any convenient time thereafter, the cage may be removed, as previously described, for disposal of the mouse.

Having thus described my invention, I claim:

1. A rodent trap including a casing providing successive communicating entrance, bait, trip, and exit chambers, the entrance chamber being formed with an entrance and the exit chamber with an exit, a cage disposed for entry through said exit, entrance-closing mechanism in said entrance chamber normally gravitating to set, open, position, a pivoted platform operable by a rodent thereon for shifting said mechanism to closed position for blocking said entrance, latch means automatically operable to secure said mechanism in closed position, releasing mechanism disposed in said trip chamber and including a pivoted trip platform normally gravitating to set position for blocking retreat from the exit chamber and provided with tripping means coacting with said latch means, said trip platform being operable by a rodent thereon for tripping said latch means and releasing said entrance closing mechanism for automatic return to set position, and cage-closing mechanism disposed in said exit chamber and including a pivoted exit platform normally gravitating to set, closed, position for blocking said exit to cut off retreat from the cage and operable by a rodent thereon to open position for clearing said exit to permit entry of the rodent into the cage.

2. In a rodent trap, a casing providing an entrance chamber having an entrance, a platform pivoted in said chamber to extend adjacent said entrance and adapted to be depressed by a rodent thereon, said platform being provided near its forward end with a slot, a latch pivoted at its lower end beneath said platform to extend at its upper end portion freely through said slot and gravitating to coact with a wall of the slot for locking the platform in set, raised, position, a treadle pivoted upon the platform and normally gravitating to engage the latch beneath the platform, the treadle being operable by a rodent to trip the latch and free the platform for downward movement, an entrance-closing rocker pivoted within said chamber above the platform and movable to closed position for blocking said entrance but normally gravitating to open position for clearing said entrance, and a tail arm carried by the platform to extend beneath the rear end of the rocker and operable to swing the rocker to closed position as the platform is depressed as well as operable by the rocker as it gravitates to open position to raise the platform to set position.

3. In a rodent trap, a casing proving an entrance chamber having an entrance, a platform pivoted in said chamber to extend adjacent said entrance and adapted to be depressed by a rodent thereon, a latch pivoted beneath said platform and gravitating to coact therewith for locking the platform in set, raised, position, a treadle pivoted upon the platform and normally gravitating to engage the latch, the treadle being operable by a rodent to trip the latch and free the platform for downward movement, an entrance-closing rocker pivoted within said chamber above the platform and movable to closed position for blocking said entrance but normally gravitating to open position for clearing said entrance, a tail arm carried by the platform to extend beneath the rear end of the rocker and operable to swing the rocker to closed position as the platform is depressed as well as operable by the rocker as it gravitates to open position to raise the platform to set position, and a latch pivoted within said chamber and normally gravitating to engage the forward end of the rocker when the rocker is in closed position for locking the rocker in closed position.

4. In a rodent trap, a casing providing an entrance chamber having an entrance, a platform pivoted in said chamber to extend adjacent said entrance and adapted to be depressed by a rodent thereon, a latch pivoted beneath said platform and gravitating to coact therewith for locking the platform in set, raised, position, a treadle pivoted upon the platform and normally gravitating to engage the latch, the treadle being operable by a rodent to trip the latch and free the platform for downward movement, an entrance-closing rocker pivoted within said chamber above the platform and movable to closed position for blocking said entrance but normally gravitating to open position for clearing said entrance, a tail arm carried by the platform to extend beneath the rear end of the rocker and operable to swing the rocker to closed position as the platform is depressed as well as operable by the rocker as it gravitates to open position to raise the platform to set position, a latch pivoted within said chamber and normally gravitating to engage the forward end of the rocker when the rocker is in closed position for locking the rocker in closed position, and a tail piece carried by said arm to extend over the rear end of the rocker and engageable by the rocker for holding said platform depressed while the rocker is locked in closed position.

5. In a rodent trap, a casing providing successive communicating entrance, bait, and trip chambers, the entrance chamber being provided with an entrance, a platform pivoted in the entrance chamber to extend adjacent said entrance and adapted to be depressed by a rodent thereon, an entrance-closing rocker pivoted in said entrance chamber to operatively coact with said platform and normally gravitating to open position for clearing said entrance as well as raising said platform but operably engageable by the platform for movement to closed position for blocking said entrance as the platform is depressed, a pivoted latch normally gravitating to engage said rocker when in closed position for locking said rocker in closed position, said latch being provided with a lever, a trip platform pivoted in said trip chamber and normally gravitating to set, rearwardly tilted, position but adapted to be rocked forwardly by a rodent thereon, and a lever carried by said trip platform to slidably coact with said latch lever and operable as the trip platform is rocked forwardly to trip said latch and release said rocker for movement to open position.

6. In a rodent trap, a casing providing successive communicating entrance, bait, and trip chambers, the entrance chamber being provided with an entrance, a platform pivoted in the entrance chamber to extend adjacent said entrance and adapted to be depressed by a rodent thereon, an entrance-closing rocker pivoted in said entrance chamber to operatively coact with said platform and normally gravitating to open position for clearing said entrance as well as raising said platform but operably engageable by the platform for movement to closed position for blocking said entrance as the platform is depressed, a pivoted latch normally gravitating to engage said rocker when in closed position for locking said rocker in closed position, said latch being provided with a lever, a trip platform pivoted in said trip chamber and normally gravitating to set, rearwardly tilted, position but adapted to be rocked forwardly by a rodent thereon, a lever carried by said trip platform to slidably coact with said latch lever and operable as the trip platform is rocked forwardly to trip said latch and release said rocker for movement to open position, latch means pivoted in said trip chamber and operable by the trip platform as it tilts rearwardly to lock the trip platform set, and a treadle pivoted upon said trip platform to normally engage said latch means and operable by a rodent to release said latch means and free the trip platform for forward tilting movement.

7. In a rodent trap, a casing providing a chamber, a platform pivoted in said chamber and normally gravitating to rearwardly tilted, set, position but adapted to be rocked forwardly by a rodent thereon, latch means pivoted in said chamber to extend freely through the platform and operable by the platform as it tilts rearwardly to lock said platform set in its set position, and a treadle pivoted upon said platform to normally engage said latch means beneath the platform and operable by a rodent to release said means and free the platform for forward tilting movement.

8. In a rodent trap, a casing providing a chamber, a platform pivoted in said chamber and normally gravitating to rearwardly tilted, set, position but adapted to be rocked forwardly by a rodent thereon, a latch pivoted in said chamber to extend over the rear end of said platform and provided with a socket, a catch carried by the platform to normally engage in said socket for locking the platform in its set position, a treadle pivoted upon the platform to normally engage beneath the free end of said latch and operable by a rodent to raise the latch and free the platform for forward tilting movement, and a tail rod carried by the latch to extend beneath the rear end of the platform for engagement thereby to return the latch into engagement with said catch as the platform returns to rearwardly tilted, set, position.

9. In a rodent trap, a casing providing a chamber, a platform pivoted in said chamber and normally gravitating to rearwardly tilted, set, position but adapted to be rocked forwardly by a rodent thereon, a catch rigid with and extending upwardly from one end of the platform and having its upper end intermediate the ends of the platform and over the platform and in the path of the movement of the rodent so that the rodent must pass thereover to move to the other end of the platform, a latch pivoted in said chamber and bowed to extend over said catch to normally engage therewith for latching the platform in its set position, and means operable by the rodent for tripping said latch and freeing the platform for forward tilting movement.

10. In a rodent trap, a casing providing an exit chamber having an exit, a cage disposed for entry through said exit, a platform pivoted in said chamber and normally gravitating to rearwardly tilted, set, position for blocking said exit to cut off retreat from the cage, means at the rear end of the platform for normally latching the platform in its set position, and a treadle pivoted upon the platform to extend at one end rearwardly of the pivotal center of the platform to engage beneath said means and at its opposite end forwardly of said pivotal center for operation by a rodent to trip said means and free the platform for forward tilting movement.

11. In a rodent trap, a casing providing an entrance chamber having an entrance, a shelf disposed in said chamber, a platform pivoted in said chamber beneath the shelf to extend adjacent said entrance and adapted to be depressed by a rodent thereon, a rocker pivoted in said chamber above the shelf and movable to rest at its forward end portion upon the shelf in closed position for blocking said entrance, the rear end portion of the rocker projecting rearwardly of the shelf, and a tail rod carried by said platform to project rearwardly of the shelf and coact with the rear end of the rocker, said rod being adapted to swing the rocker to closed position when the platform is depressed.

WILLIAM T. HEMBREE.

REFERENCES CITED

The following references are of record in the file of this patent:

UNITED STATES PATENTS

| Number | Name | Date |
|---|---|---|
| 189,346 | Early | Apr. 10, 1877 |
| 267,004 | Leese | Nov. 7, 1882 |
| 405,006 | Brawn | June 11, 1889 |
| 450,176 | Merrell | Apr. 14, 1891 |
| 617,160 | Hoover | Jan. 3, 1899 |
| 666,279 | Lesser | Jan. 22, 1901 |
| 947,250 | Marchand | Jan. 25, 1910 |
| 1,066,004 | Ellison | July 1, 1913 |
| 1,327,490 | Miller | Jan. 6, 1920 |
| 1,511,399 | Culek | Oct. 14, 1924 |